United States Patent
Kim et al.

(10) Patent No.: US 10,739,594 B2
(45) Date of Patent: Aug. 11, 2020

(54) DISPLAY DEVICE HAVING AN EYEPIECE

(71) Applicant: LG Display Co., Ltd., Seoul (KR)

(72) Inventors: Sung-Woo Kim, Seoul (KR); Sung-Min Jung, Seoul (KR); Keong-Jin Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 6 days.

(21) Appl. No.: 16/135,515

(22) Filed: Sep. 19, 2018

(65) Prior Publication Data

US 2019/0086672 A1    Mar. 21, 2019

(30) Foreign Application Priority Data

Sep. 20, 2017 (KR) .................. 10-2017-0121286

(51) Int. Cl.
| | | |
|---|---|---|
| *G02B 27/01* | (2006.01) | |
| *G02B 5/08* | (2006.01) | |
| *G02B 5/30* | (2006.01) | |
| *G02B 27/28* | (2006.01) | |

(52) U.S. Cl.
CPC .......... *G02B 27/0172* (2013.01); *G02B 5/08* (2013.01); *G02B 5/3025* (2013.01); *G02B 5/3083* (2013.01); *G02B 27/286* (2013.01); *G02B 2027/0132* (2013.01); *G02B 2027/0178* (2013.01)

(58) Field of Classification Search
CPC combination set(s) only.
See application file for complete search history.

(56) References Cited

U.S. PATENT DOCUMENTS

| | | |
|---|---|---|
| 5,731,866 A | 3/1998 | Taber et al. |
| 2001/0048497 A1 | 12/2001 | Miyachi et al. |
| 2005/0134771 A1* | 6/2005 | Kim ................. G02F 1/133371 349/114 |
| 2017/0123221 A1 | 5/2017 | Sharp et al. |
| 2017/0227770 A1 | 8/2017 | Carollo et al. |

FOREIGN PATENT DOCUMENTS

| | | |
|---|---|---|
| JP | 2003-008950 A | 1/2003 |
| KR | 10-2015-0109852 A | 10/2015 |

OTHER PUBLICATIONS

Extended European Search Report issued in corresponding European Patent Application No. 18194696.3, dated Feb. 11, 2019.
Office Action issued in corresponding Korean Patent Application No. 10-2017-0121286 dated Jul. 15, 2018.

\* cited by examiner

*Primary Examiner* — Van N Chow
(74) *Attorney, Agent, or Firm* — Morgan, Lewis & Bockius LLP

(57) ABSTRACT

A display device having an eyepiece is provided. The display device includes a display panel and an eyepiece. An image realized by the display panel may be provided to user through the eyepiece. An optical module may be disposed between the display panel and the eyepiece in order to increase a path of light. For example, the optical module may include a front quarter-wave plate, a half-mirror, a rear quarter-wave plate and a linear reflective polarizing plate, which are sequentially stacked. A positive C-plate may be disposed in the optical module. The light travelling toward the eyepiece from the display panel may pass through the positive C-plate. Thus, in the display device, the overall thickness may be reduced, and the viewing angle may be increased.

13 Claims, 8 Drawing Sheets

DISPLAY DEVICE HAVING AN EYEPIECE

This application claims the priority benefit of Korean Patent Application No. 10-2017-0121286, filed on Sep. 20, 2017, which is hereby incorporated by reference as if fully set forth herein.

BACKGROUND

Technical Field

The present disclosure relates to a display device in which an image realized by a display panel is provided through an eyepiece.

Discussion of the Related Art

Generally, a display device includes a display panel which realizes an image. For example, the display device may include a liquid crystal panel having a liquid crystal, and an OLED panel having an organic light-emitting element.

The display device may further include an eyepiece for providing an image realized by the display panel to user, and a mounting member to align the eyepiece with the user. The display panel may be aligned with the eyepiece. The display panel may be accommodated in an image member. The mounting member may be coupled to the image member. For example, the display device may be a head mounted display device (HMD).

A thickness of the display device may be proportional to a distance between the display panel and the eyepiece. When the eyepiece is disposed too close to the display panel, the image realized by the display panel may be enlarged to the user. Thus, in the display device, when the distance between the display panel and the eyepiece of the display device is smaller than a certain value, the user may recognize a non-display region in which a black matrix is located. Therefore, the display device may include the eyepiece spaced away from the display panel by a predetermined distance or more, so that the deterioration of the quality of the image realized by the display panel may be prevented.

The display device may increase a path of light travelling toward the eyepiece from the display panel using a polarizer and a quarter-wave plate in order to reduce the distance between the display panel and the eyepiece without the deterioration of the quality of the image. However, the display device may have the variation of the refractive index according to the angle due to the polarizer and the quarter-wave plate. Since the variation of the refractive index according to the angle may cause light leakage in the diagonal direction, the viewing angle of the image realized by the display panel may be reduced. That is, in the display device, the image may be blurred at an angle more than a predetermined angle, so that the quality of the image may be degreased.

SUMMARY

Accordingly, embodiments of the present disclosure are directed to a display device that substantially obviates one or more problems due to limitations and disadvantages of the related art.

An aspect of the present disclosure is to provide a display device in which the deterioration of the quality of the image may be minimized and the overall thickness may be reduced.

Another aspect of the present disclosure is to provide a display device capable of minimizing the deterioration of the viewing angle due to the optical components which are used to increase a path of light emitted from the display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises an eyepiece on a display panel. An optical module is disposed between the display panel and the eyepiece. The optical module includes a front linear polarizer, a front quarter-wave plate, a half-mirror, a rear quarter-wave plate and a linear reflective polarizing plate which are sequentially stacked. A first positive C-plate is disposed in the optical module. Light travelling toward the eyepiece from the display panel passes through the first positive C-plate.

A refractive index of the first positive C-plate in a X direction may be the same as a refractive index of the first positive C-plate in a Y direction perpendicular to the X direction. A refractive index of the first positive C-plate in a thickness direction may be larger than the refractive index of the first positive C-plate in the X direction. The retardation in a bottom surface of the first positive C-plate is zero.

The first positive C-plate may be disposed between the half-mirror and the rear quarter-wave plate.

An air gap may be disposed between the rear quarter-wave plate and the linear reflective polarizing plate.

A second positive C-plate may be disposed between the front quarter-wave plate and the half-mirror.

The second positive C-plate may include a material same as the first positive C-plate.

A thickness of the second positive C-plate may be the same as a thickness of the first positive C-plate.

The optical module may further include a rear linear polarizer. The second positive C-plate may be disposed between the rear quarter-wave plate and the rear linear polarizer.

In another aspect, a display device comprises a half-mirror between a display panel and an eyepiece. A front quarter-wave plate is disposed between the display panel and the half-mirror. A front linear polarizer is disposed between the display panel and the front quarter-wave plate. A rear quarter-wave plate is disposed between the half-mirror and the eyepiece. A linear reflective polarizing plate is disposed between the rear quarter-wave plate and the eyepiece. A positive C-plate is disposed on a path of light travelling toward the eyepiece from the display panel.

The positive C-plate may have a retardation of 30 to 330 in a thickness direction.

The positive C-plate may be disposed between the quarter-wave plate and the linear reflective polarizing plate.

An air gap may be disposed between the rear quarter-wave plate and the positive C-plate.

The display panel may include a lower substrate, a lower electrode, a light-emitting layer, an upper electrode and an upper substrate, which are sequentially stacked.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION OF THE EMBODIMENTS

Figure 1:
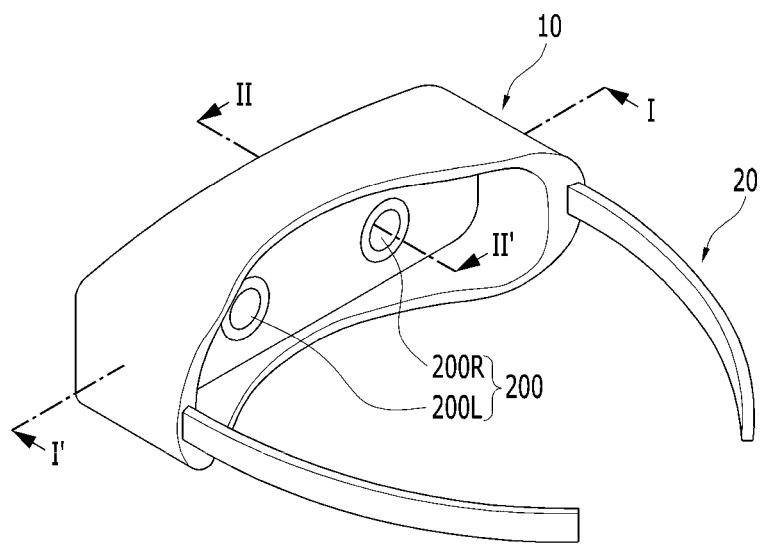
FIG. 1 is a view schematically showing a display device according to an embodiment of the present invention.

Hereinafter, details related to the above objects, technical configurations, and operational effects of the embodiments of the present invention will be clearly understood by the following detailed description with reference to the drawings, which illustrate some embodiments of the present invention. Here, the embodiments of the present invention are provided in order to allow the technical spirit of the present invention to be satisfactorily transferred to those skilled in the art, and thus the present invention may be embodied in other forms and is not limited to the embodiments described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical spirit of the present invention.

The terms used in the specification of the present invention are merely used in order to describe particular embodiments, and are not intended to limit the scope of the present invention. For example, an element described in the singular form is intended to include a plurality of elements unless the context clearly indicates otherwise. In addition, in the specification of the present invention, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 2A:
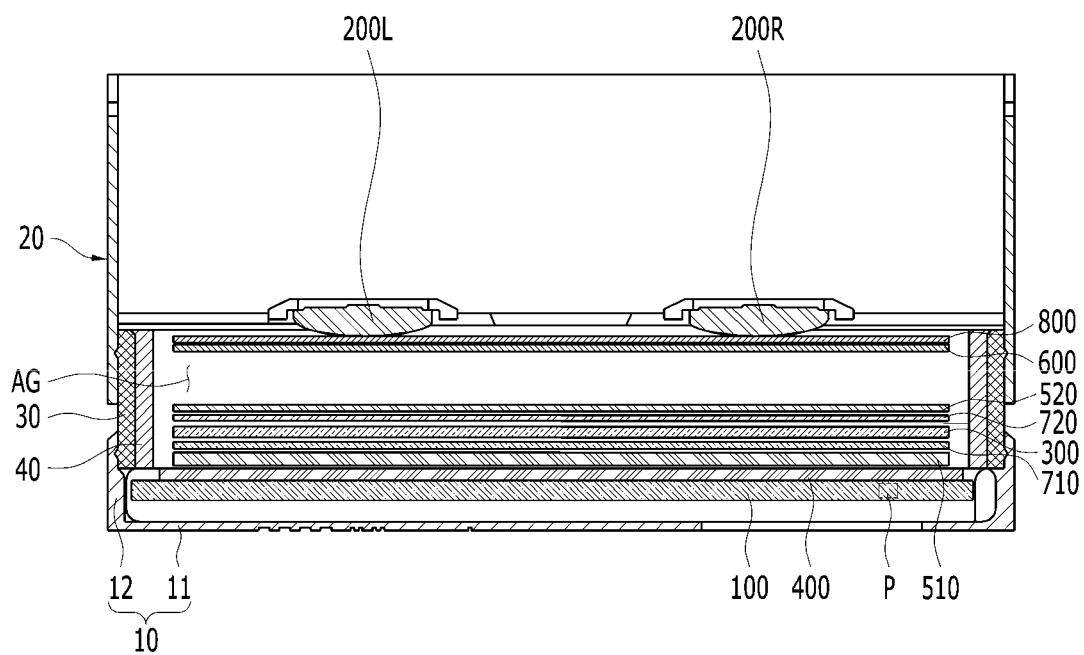
FIG. 2A is a view taken along I-I of FIG. 1.
Figure 2B:
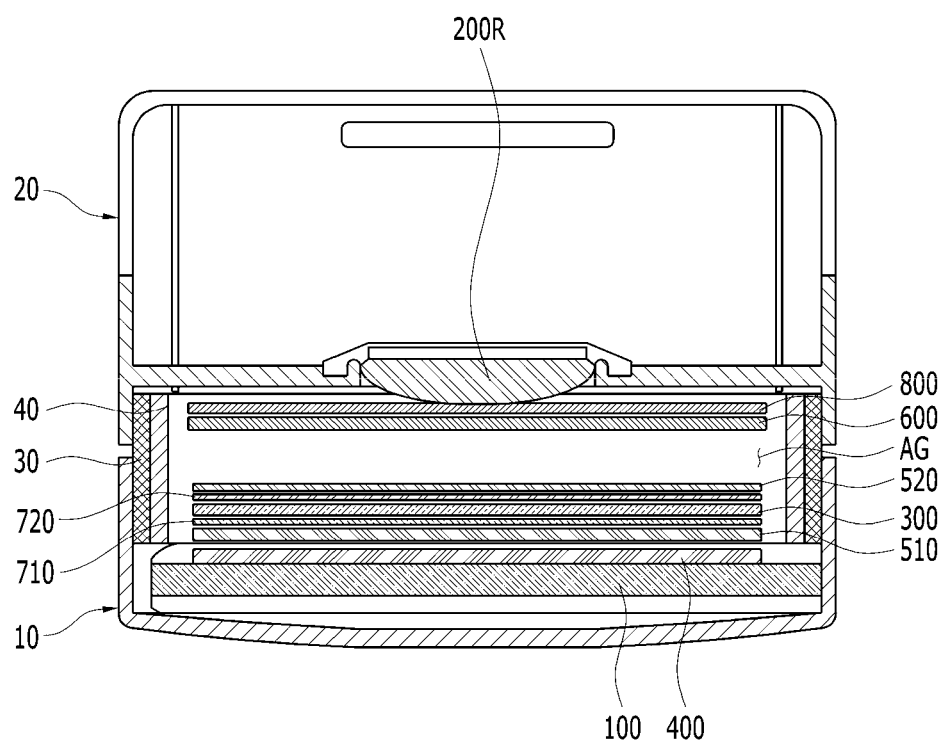
FIG. 2B is a view taken along II-II' of FIG. 1.
Figure 2C:
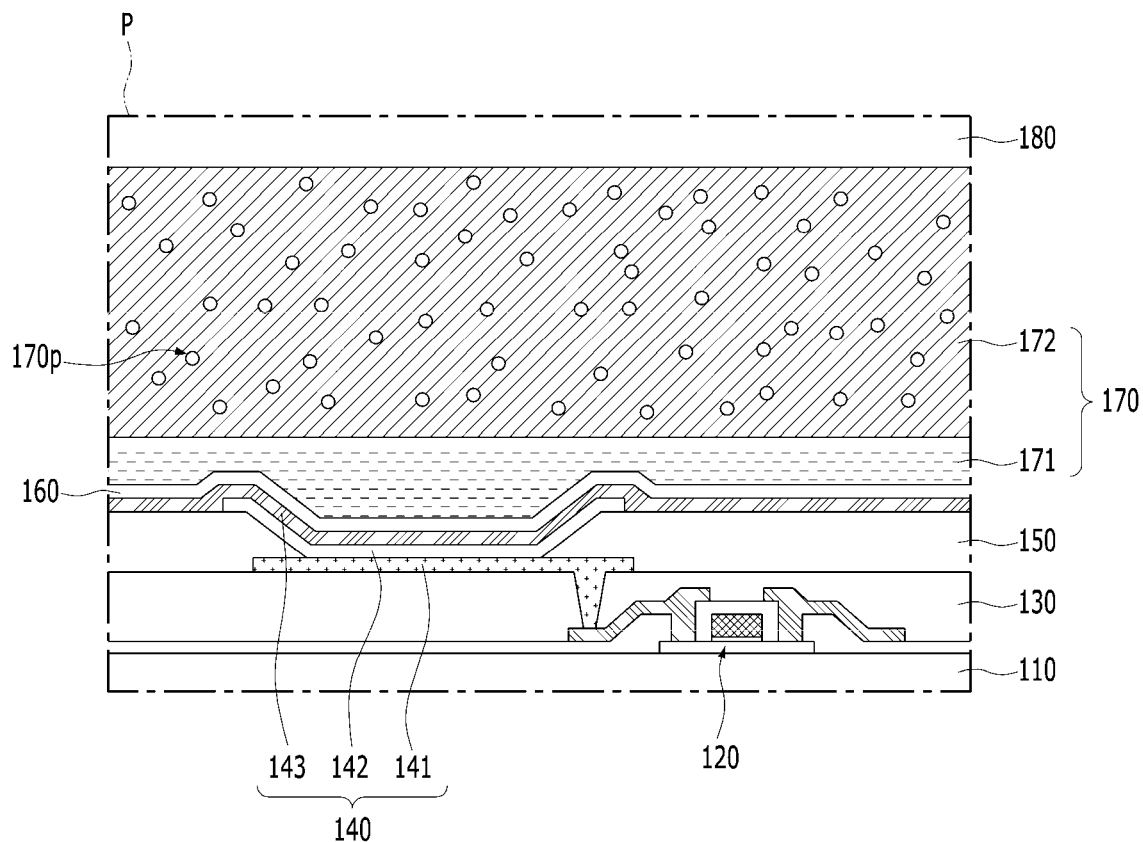
FIG. 2C is an enlarged view of P region in FIG. 2A.

FIG. 1 is a view schematically showing a display device according to an embodiment of the present invention. FIG. 2A is a view taken along I-I of FIG. 1. FIG. 2B is a view taken along II-II' of FIG. 1. FIG. 2C is an enlarged view of P region in FIG. 2A.

Referring FIGS. 1 and 2A to 2C, the display device according to the embodiment of the present invention may include an image member 10 and a mounting member 20 for aligning the image member 10 to user.

The image member 10 may realize an image which is provided to user. For example, the image member 10 may realize an image for a virtual reality (VR) or an augmented reality (AR). The image member 10 may be fixed to the front of the user's eye by the mounting member 20. For example, the display device according to the embodiment of the present invention may be a head mounted display apparatus (HMD) mounted on the user' head.

The display device according to the embodiment of the present invention is described that the mounting member 20 is a shape like a leg of an eyeglass frame. However, the display device according to another embodiment of the present invention may include a various types of the mounting member 20. For example, in the display device according to another embodiment of the present invention, the mounting member 20 may be a head gear shape which is worn on the user's head.

The display device according to the embodiment of the present invention may further include a coupling member 30 for coupling the mounting member 20 to the image member 10. The coupling member 30 may include a first region coupled to the image member 10, and a second region coupled to the mounting member 20. For example, the coupling member 30 may be a plate shape.

A display panel 100 may be disposed inside the image member 10. For example, the image member 10 may include a supporting region 11 in which the display panel 100 is mounted, and a peripheral region 12 protruding from the supporting region 11. The coupling member 30 may be coupled to the peripheral region 12 of the image member 10.

The display panel 100 may generate the image which is provided to the user. For example, the display panel 100 may include a lower display substrate 110, a light-emitting element 140 and an upper display substrate 180, which are sequentially stacked. The light-emitting element 140 may generate light displaying a specific color to realize the image. For example, the light-emitting element 140 may include a lower emission electrode 141, a light-emitting layer 142 and an upper emission electrode 143, which are sequentially stacked. The light-emitting layer 142 may include an organic emission material or an inorganic emission material. For example, the display panel 100 of the display device according to the embodiment of the present invention may be an OLED panel including an organic light-emitting element.

The display panel 100 may further include a thin film transistor 120 disposed between the lower display substrate 110 and the light-emitting element 140, an over-coat layer 130 covering the thin film transistor 120, and a bank insulating layer 150 covering an edge of the lower emission electrode 141. The over-coat layer 130 may remove a thickness difference due to the thin film transistor 120. The light-emitting element 140 may be disposed on the over-coat layer 130. For example, the over-coat layer 130 may include an electrode contact hole exposing a drain electrode of the thin film transistor 120.

The display panel 100 may further include an upper passivation layer 160 and an adhesive layer 170 which are disposed between the light-emitting element 140 and the upper display substrate 180. The upper passivation layer 160 may prevent the damage of the light-emitting element 140 due to the external impact and moisture. The adhesive layer 170 may be disposed between the upper passivation layer 160 and the upper display substrate 180. The upper display substrate 180 may be coupled to the lower display substrate 110 in which the upper passivation layer 160 is formed, by the adhesive layer 170. The adhesive layer 170 may have a multi-layer structure. For example, the adhesive layer 170 may include a lower adhesive layer 171 and an upper adhesive layer 172. The upper adhesive layer 172 may be disposed between the lower adhesive layer 171 and the upper display substrate 180. The upper adhesive layer 172 may include a moisture-absorbing material 170*p*. The lower adhesive layer 171 may relieve the stress applied to the light-emitting element 140 due to the expansion of the moisture-absorbing material 170*p*.

An eyepiece 200 may be disposed on the display panel 100. The light emitted from the display panel 100 may move toward the user through the eyepiece 200. The image realized by the display panel 100 may be recognized to the user through the eyepiece 200. The eyepiece 200 may be aligned with the user's eye by the mounting member 20. For example, the eyepiece 200 may include a left lens 200L aligned with the left eye of the user, and a right lens 200R aligned with the right eye of the user. The position of the eyepiece 200 may be fixed by the image member 10. For example, the eyepiece 200 may be coupled to a portion of the image member 10.

Optical module may be disposed between the display panel 100 and the eyepiece 200 to increase a path of light travelling toward the eyepiece 200 from the display panel 100. For example, the optical module may include a half-mirror 300, a front linear polarizer 400, a front quarter-wave plate 510, a rear quarter-wave plate 520 and a linear reflective polarizing plate 600, which are disposed side by side.

The half-mirror 300 may be disposed between the display panel 100 and the eyepiece 200. The half-mirror 300 may partially reflect the light incident on the half-mirror 300. For example, only half of the light incident on the half-mirror 300 may pass through the half-mirror 300. The half-mirror 300 may include a semi-transparent material. For example, the half-mirror 300 may include a thin layer formed of a metal, such as magnesium (Mg), silver (Ag) and aluminum (Al).

The front linear polarizer 400 may be disposed between the display panel 100 and the half-mirror 300. The front linear polarizer 400 may be disposed close to the display panel 100. For example, the front linear polarizer 400 may be attached to a surface of the display panel 100 facing the half-mirror 300.

The front linear polarizer 400 may have a transmission axis in a first direction. For example, the light emitted from the display panel 100 may be linearly polarized in the first direction by the front linear polarizer 400.

The front quarter-wave plate 510 may be disposed between the front linear polarizer 400 and the half-mirror 300. The front quarter-wave plate 510 may delay the phase of the light passing through the front quarter-wave plate 510 by $\lambda/4$. For example, the light which is linearly polarized by the front linear polarizer 400 may be right-circularly polarized by the front quarter-wave plate 510.

The rear quarter-wave plate 520 may be disposed between the half-mirror 300 and the linear reflective polarizing plate 600. The rear quarter-wave plate 520 may delay the phase of light passing through the rear quarter-wave plate 520. The phase of the light passing through the rear quarter-wave plate 520 may be delayed in a direction opposite to the phase of the light passing through the front quarter-wave plate 510. For example, the rear quarter-wave plate 520 may delay the phase of light by $-\lambda/4$. The light passing through the rear quarter-wave plate 520 may have a polarized rotation direction opposite to the light passing through the front quarter-wave plate 510. For example, the light which is right-circularly polarized by the front quarter-wave plate 510 may become the light which is linearly polarized in a first direction by the rear quarter-wave plate 520.

The linear reflective polarizing plate 600 may be disposed between the rear quarter-wave plate 520 and the eyepiece 200. The linear reflective polarizing plate 600 may reflect the light which is linearly polarized in a direction. For example, the light which is linearly polarized in the first direction may be reflected by the linear reflective polarizing plate 600. The light which is linearly polarized in a second direction perpendicular to the first direction may pass through the linear reflective polarizing plate 600. The linear reflective polarizing plate 600 may include an advanced polarizing film (APF) or a dual bright enhanced film (DBEF).

A front positive C-plate 710 and a rear positive C-plate 720 may be disposed inside the optical module. The front positive C-plate 710 and the rear positive C-plate 720 may be disposed on a path of light travelling toward the eyepiece 200 from the display panel 100.

FIGS. 3A to 3H are views sequentially showing the moving direction and the polarized state of light travelling toward an eyepiece from a display panel in the display device according to the embodiment of the present invention.

Figure 3A:
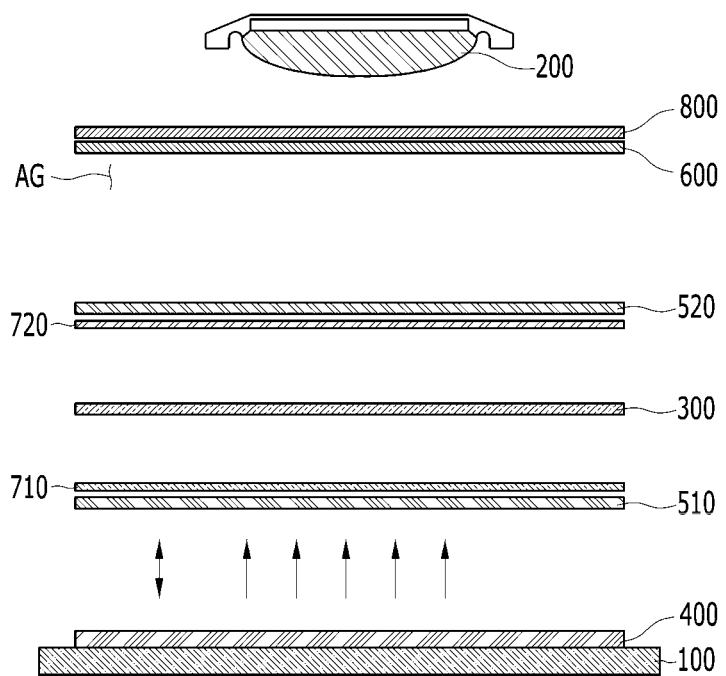
FIGS. 3A to 3H are views sequentially showing the moving direction and the polarized state of light travelling toward an eyepiece from a display panel in the display device according to the embodiment of the present invention.

The movement path of the light emitted from the display panel 100 of the display device according to the embodiment of the present invention will be described with reference to FIGS. 3A to 3H. First, the light emitted from the display panel 100 of the display device according to the embodiment of the present invention may pass through the front linear polarizer 400, as shown in FIG. 3A.

The light passing through the front linear polarizer 400 may move toward the front quarter-wave plate 510. For example, in the display device according to the embodiment of the present invention, the light incident on the front quarter-wave plate 510 may be the light which is linearly polarized in the first direction by the front linear polarizer 400.

Figure 3B:
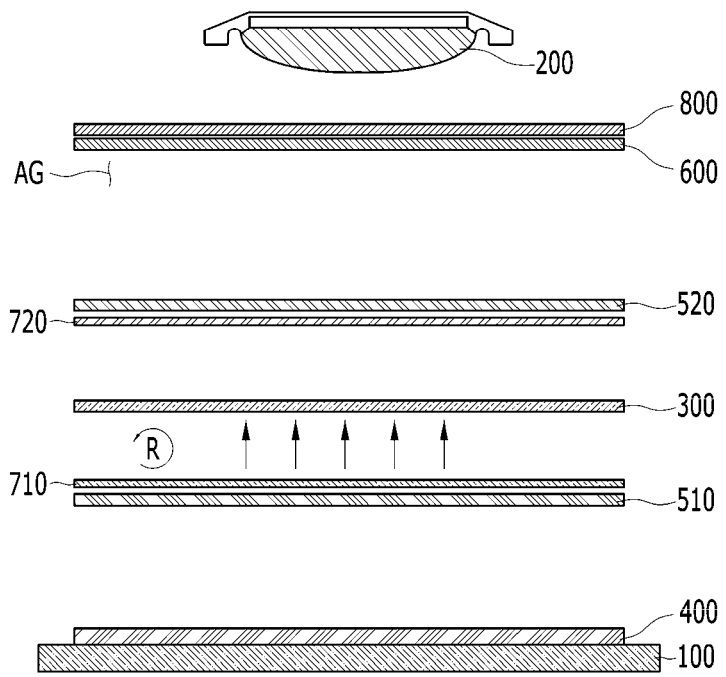

In the display device according to the embodiment of the present invention, the light which is linearly polarized in the first direction by the front linear polarizer 400 may sequentially pass through the front quarter-wave plate 510 and the front positive C-plate 710, as shown in FIG. 3B.

The light passing through the front quarter-wave plate 510 and the front positive C-plate 710 may move toward the half-mirror 300. The front quarter-wave plate 510 may delay the phase of the light which is linearly polarized in the first direction by the front linear polarizer 400, by $\lambda/4$. For example, the light passing through the front quarter-wave plate 510 may be the light which is right-circularly polarized. The light which is right-circularly polarized by the front quarter-wave plate 510 may move toward the half-mirror 300 after passing through the front positive C-plate 710.

Figure 3C:
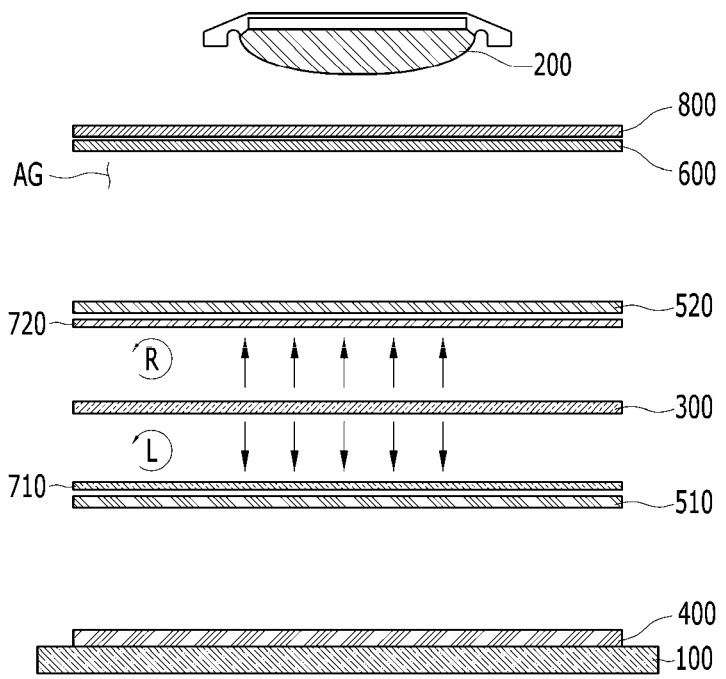

In the display device according to the embodiment of the present invention, the light passing through the front positive C-plate 710 may be reflected by the half-mirror 300 or may transmit the half-mirror 300, as shown in FIG. 3C.

The polarized rotating direction of the light reflected by the half-mirror 300 may opposite to the polarized rotating direction of the light incident on the half-mirror 300. The moving direction of the light reflected by the half-mirror 300 may opposite to the moving direction of the light incident on the half-mirror 300. The phase of the light reflected by the half-mirror 300 may be inverted. The light reflected by the half-mirror 300 may move toward the front positive C-plate 710. For example, the light reflected toward the front positive C-plate by the half-mirror 300 may be the light which is left-circularly polarized.

The phase of the light passing through the half-mirror 300 may be not changed. The light passing through the half-mirror 300 may move toward the rear positive C-plate 720. For example, the light moving toward the rear positive C-plate 720 after passing through the half-mirror 300 may be the light which is right-circularly polarized.

Figure 3D:
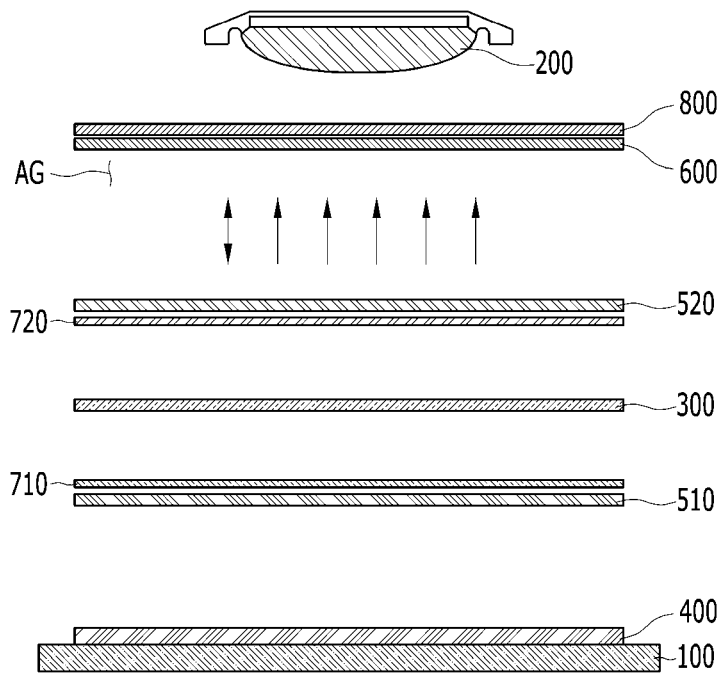

In the display device according to the embodiment of the present invention, the light passing through half-mirror 300 may sequentially pass through the rear positive C-plate 720 and the rear quarter-wave plate 520, as shown in FIG. 3D.

The light passing through the rear quarter-wave plate 520 may move toward the linear reflective polarizing plate 600. The rear quarter-wave plate 520 may delay the phase of the light passing through half-mirror 300 by $-\lambda/4$. For example, the light passing through the half-mirror 300 which is right-circularly polarized may become the light which is linearly polarized in the first direction by the rear quarter-wave plate 520.

Figure 3E:
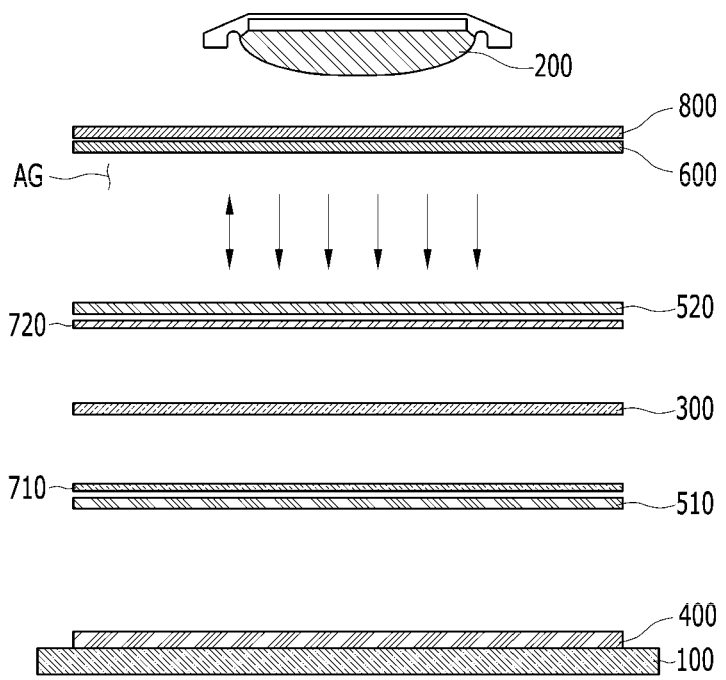

In the display device according to the embodiment of the present invention, the light passing through the rear quarter-wave plate 520 which is linearly polarized in the first direction by the rear quarter-wave plate 520 may be reflected by the linear reflective polarizing plate 600, as shown in FIG. 3E.

The light reflected by the linear reflective polarizing plate 600 may move toward the rear quarter-wave plate 520. Since the light incident on the linear reflective polarizing plate 600 is the light linearly polarized, the phase of the light incident on the linear reflective polarizing plate 600 may be not changed by the reflection of the linear reflective polarizing plate 600.

Figure 3F:
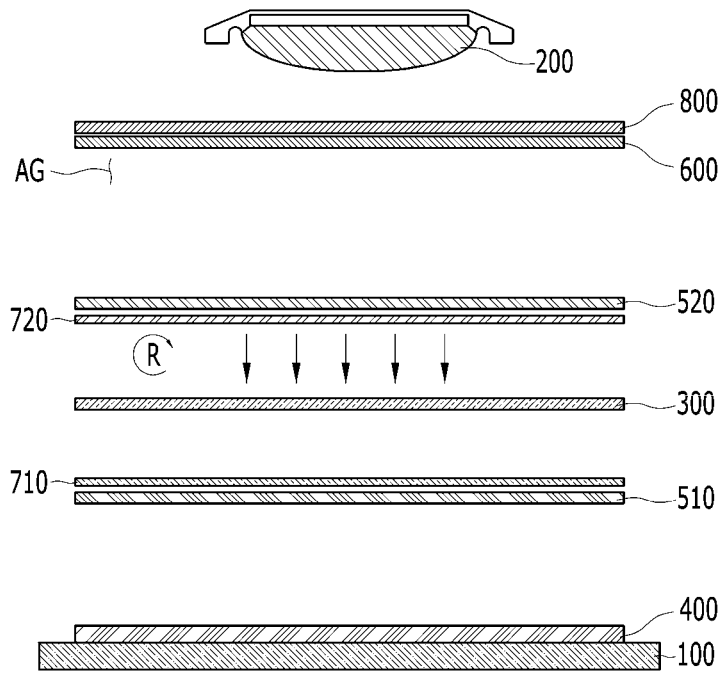
Figure 3G:
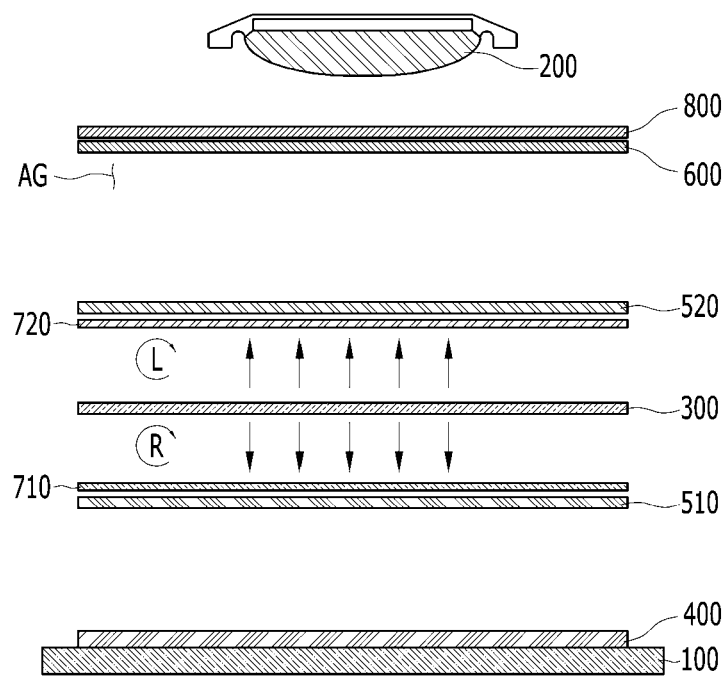

In the display device according to the embodiment of the present invention, the light reflected by the linear reflective polarizing plate 600 may sequentially pass through the rear quarter-wave plate 520 and the rear positive C-plate 720, as shown in FIG. 3F.

The light passing through the rear positive C-plate 720 may move toward the half-mirror 300. The light reflected by the linear reflective polarizing plate 600 may be right-circularly polarized by the rear quarter-wave plate 520 to have a polarized rotating direction opposite to the light passing through the front quarter-wave plate 510. The light reflected by the linear reflective polarizing plate 600 may be the light which is linearly polarized in the first direction same as the light passing the front linear polarizer 400. The moving direction of the light reflected by the linear reflective polarizing plate 600 may be opposite to the moving direction of the light incident on the front quarter-wave plate 510 from the front linear polarizer 400. For example, the light passing through the rear quarter-wave plate 520 and the rear positive C-plate 720 may be the light which is right-circularly polarized.

In the display device according to the embodiment of the present invention, the light sequentially passing through the rear quarter-wave plate 520 and the rear positive C-plate 720 may move toward the half-mirror 300.

The light sequentially passing through the rear quarter-wave plate 520 and the rear positive C-plate 720 may be reflected again toward the rear positive C-plate 720 by the half-mirror 300. Since the phase of the right-circularly polarized light reflected by the half-mirror is inverted, the light reflected again toward the rear positive C-plate 720 by the half-mirror 300 may be the light which is left-circularly polarized.

Figure 3H:
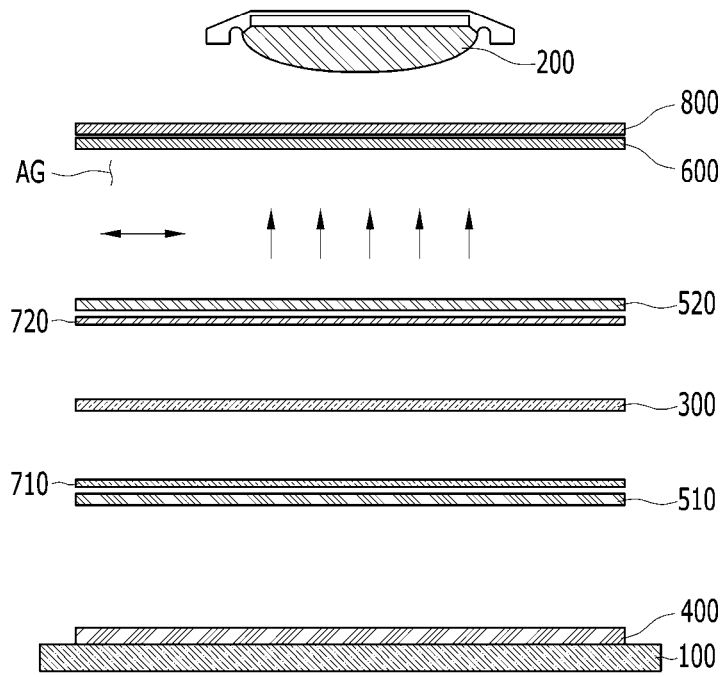

In the display device according to the embodiment of the present invention, the light reflected again by the half-mirror 300 may sequentially pass through the rear positive C-plate 720 and the rear quarter-wave plate 520, as shown in FIG. 3H.

The light reflected again by the half-mirror 300 may become the light which is linearly polarized in the second direction perpendicular to the first direction by the rear quarter-wave plate 520. The light which is linearly polarized in the second direction by the rear quarter-wave plate 520 may toward the eyepiece 200 by passing through the linear reflective polarizing plate 600. Thus, in the display device according to the embodiment of the present invention, the path of the light travelling toward the eyepiece 200 from the display panel 100 may be increased due to the reflection of the linear reflective polarizing plate 600 and the reflection of the half-mirror 300. That is, in the display device according to the embodiment of the present invention, the path of the light emitted from the display panel 100 may be increased by twice of the distance between the half-mirror 300 and the linear reflective polarizing plate 600. Also, in the display device according to the embodiment of the present invention, since the transmission axis of the linear reflective polarizing plate 600 is perpendicular to the transmission axis of the front linear polarizer 400, the light which is not reflected again by the half-mirror 300 may be not emitted. Therefore, in the display device according to the embodiment of the present invention, the sharpness of the realized image may be improved.

The display device according to the embodiment of the present invention may adjust the distance between the half-mirror 300 and the linear reflective polarizing plate 600, to control the focus length of the image which is provided to the user. For example, the display device according to the embodiment of the present invention may include an air gap disposed between the rear quarter-wave plate 520 and the linear reflective polarizing plate 600. The air gap may be maintained, physically. For example, the display device according to the embodiment of the present invention may further include a gap holding member 40, as shown in FIGS. 2A and 2B. The gap holding member 40 may be disposed outside the optical module. For example, the gap holding member 40 may be disposed on the inner surface of the coupling member 30. The gap holding member 40 may be in direct contact with the coupling member 30.

A refractive index (nx) of the front positive C-plate 710 and the rear positive C-plate 720 in a X direction may be the same as a refractive index (ny) of the front positive C-plate 710 and the rear positive C-plate 720 in a Y direction perpendicular to the X direction (nx=ny). A refractive index (nz) of the front positive C-plate 710 and the rear positive C-plate 720 in a thickness direction may be larger than the refractive index (nx) of the front positive C-plate 710 and the rear positive C-plate 720 in the X direction, and the refractive index (ny) of the front positive C-plate 710 and the rear positive C-plate 720 in the Y direction (nx=ny<nz). Herein, the thickness direction of the front positive C-plate 710 and the rear positive C-plate 720 may be a direction of an optical axis of the front positive C-plate 710 and the rear positive C-plate 720. For example, in the display device according to the embodiment of the present invention, the thickness direction of the front positive C-plate 710 and the rear positive C-plate 720 may be parallel with the moving direction of the light emitted from the display panel 100. The front positive C-plate 710 and the rear positive C-plate 720 may have a structure in which molecules of bar-shape are arranged vertically. A retardation of a bottom surface of the front positive C-plate 710 and the rear positive C-plate 720 may be zero (Ro=0). Thus, in the display device according to the embodiment of the present invention, the difference of the refractive index according to the viewing angle may be compensated by the front positive C-plate 710 and the rear positive C-plate 720. The polarized light may have the same optical characteristics in the plane direction perpendicular to the optical axis. Thus, in the display device according to the embodiment of the present invention, the light leakage in the diagonal direction may be minimized.

The retardation (Rth) of the rear positive C-plate 720 in the thickness direction may be the same as the retardation (Rth) of the front positive C-plate 710 in the thickness direction. For example, the rear positive C-plate 720 may include a material same as the front positive C-plate 710. The rear positive C-plate 720 may have a thickness same as the front positive C-plate 710.

Accordingly, the display device according to the embodiment of the present invention may include the front linear polarizer 400, the front quarter-wave plate 510, the front positive C-plate 710, the half-mirror 300, the rear positive C-plate 720, the rear quarter-wave plate 520 and the linear reflective polarizing plate 600, which are disposed between the display panel 100 and the eyepiece 200, so that the path of the light travelling toward the eyepiece 200 from the display panel 100 may be increased and the difference of the refractive index according to a direction may be compensated. Thus, in the display device according to the embodiment of the present invention, the light leakage in the diagonal direction may be minimized, and the viewing angle may be increased. Therefore, in the display device according to the embodiment of the present invention, the deterioration of the quality of the image may be minimized and the overall thickness may be decreased.

Table 1 displays the angle at which the light leakage occurs, and the transmittance in the direction of the light leakage according to the retardation (Rth) in the thickness direction of the positive C-plate of the display device according to the embodiment of the present invention. Herein, the angle at which the light leakage occurs is an angle measured with respect to the front surface.

Referring to Table 1, when the retardation (Rth) in the thickness is smaller than 200, the angle at which the light leakage occurs may be increased, and the transmission in the direction of light leakage may be decreased as the retardation (Rth) in the thickness is increased. Also, when the retardation (Rth) in the thickness is larger than 200, the angle at which the light leakage occurs may be decreased, and the transmission in the direction of light leakage may be increased as the retardation (Rth) in the thickness is increased. Thus, in the display device according to the embodiment of the present invention, the viewing angle may be maximized and the deterioration of the quality of the image due to light leakage may be minimized by limiting the retardation (Rth) of the positive C-plate in the thickness direction. For example, in the display device according to the embodiment of the present invention, the front positive C-plate 710 and the rear positive C-plate 720 having retardation of 33 to 330 in the thickness direction may be disposed between the display panel 100 and the eyepiece 200, so that the deterioration of the quality of the image may be minimized, and the overall thickness may be reduced.

The display device according to the embodiment of the present invention may further include a rear linear polarizer 800 disposed between the linear reflective polarizing plate 600 and the eyepiece 200, as shown in FIGS. 2A and 2B. For example, the rear linear polarizer 800 may be attached to a surface of the linear reflective polarizing plate 600 facing the eyepiece 200. The transmission axis of the rear linear polarizer 800 may be the same as the transmission axis of the linear reflective polarizing plate 600. For example, the rear linear polarizer 800 may block the light which is linearly polarized in the first direction. Thus, in the display device according to the embodiment of the present invention, the sharpness and the color reproduction rate of the image realized on the outside of the eyepiece 200 through the linear reflective polarizing plate 600 may be improved.

Figure 4:
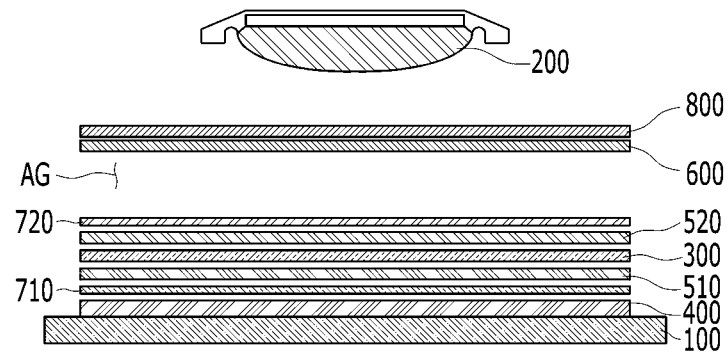
FIGS. 4 to 7 are views respectively showing the display device according to another embodiment of the present invention.

The display device according to the embodiment of the present invention is described that the front positive C-plate 710 is disposed between the front linear polarizer 400 and the front quarter-wave plate 510, and the rear positive C-plate 720 is disposed between the rear quarter-wave plate 520 and the linear reflective polarizing plate 600. However, in the display device according to another embodiment of the present invention, two positive C-plates 710 and 720 may be arranged in various ways on the path of the light travelling toward the eyepiece 200 from the display panel 100. For example, the display device according to another embodiment of the present invention may include the front linear polarizer 400, the front positive C-plate 710, the front quarter-wave plate 510, the half-mirror 300, the rear quarter-wave plate 520, the rear positive C-plate 720 and the linear reflective polarizing plate 600, which are disposed side by side between the display panel 100 and the eyepiece 200, as shown in FIG. 4. That is, in the display device according to another embodiment of the present invention, the degree of freedom for the positions of the front positive C-plate 710 and the rear positive C-plate 720 may be improved. Thus, in

TABLE 1

|  | Rth | | | | | | |
| --- | --- | --- | --- | --- | --- | --- | --- |
|  | 33.75 | 67.5 | 135 | 202.5 | 270 | 337.5 | 405 |
| Angle at which light leakage occurs | 55° | 60° | 65° | 65° | 50° | 45° | 45° |
| Transmission in the direction of light leakage | 0.0503 | 0.0421 | 0.0311 | 0.0249 | 0.0281 | 0.0499 | 0.0720 | the display device according to another embodiment of the present invention, the variation of the refractive index according to the angle may be efficiently compensated by the front positive C-plate 710 and the rear positive C-plate 720.

Figure 5:
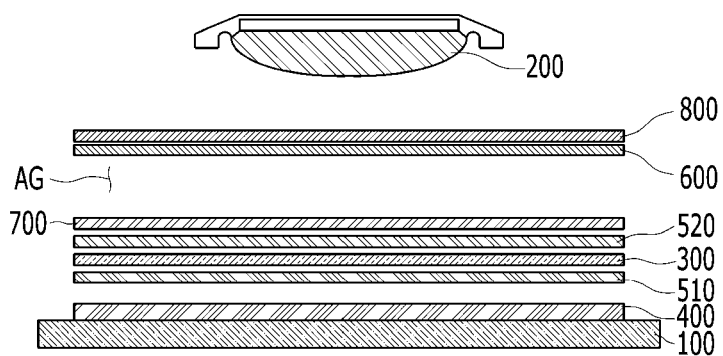
Figure 6:
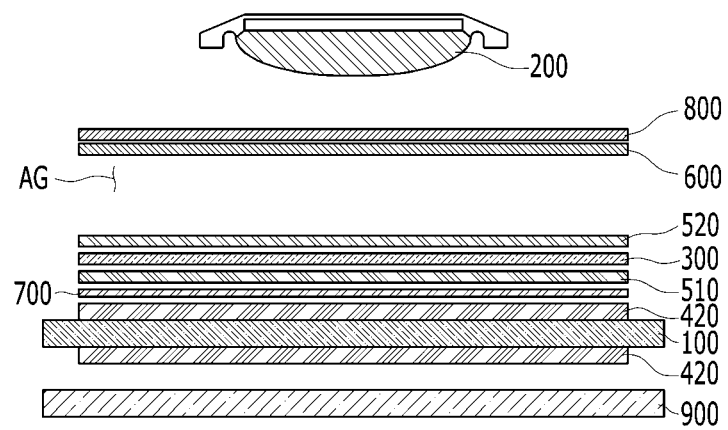

The display device according to the embodiment of the present invention is described that the light emitted from the display panel 100 passes through the front positive C-plate 710 and the rear positive C-plate 720. However, in display device according to another embodiment of the present invention, single positive C-plate 700 may be disposed on the path of the light travelling toward the eyepiece 200 from the display panel 100. For example, in display device according to another embodiment of the present invention, the positive C-plate 700 may be disposed only on a surface of the rear quarter-wave plate 520 facing the linear reflective polarizing plate 600, as shown in FIG. 5. Alternatively, in display device according to another embodiment of the present invention, the positive C-plate 700 may be disposed only between the display panel 100 and the front quarter-wave plate 510, as shown in FIG. 6. The positive C-plate 700 of the display device according to another embodiment of the present invention may be thicker than the front positive C-plate 710 and the rear positive C-plate 720 of the display device according to the embodiment of the present invention. The retardation (Rth) in the thickness direction of the positive C-plate 700 of the display device according to another embodiment of the present invention may be the same as the sum of the retardation (Rth) in the thickness direction of the front positive C-plate 710 and the retardation (Rth) in the thickness direction of the rear positive C-plate 720 of the display device according to the embodiment of the present invention. For example, the thickness of the positive C-plate 700 in the display device according to another embodiment of the present invention may be the same as the sum of the thickness of the front positive C-plate 710 and the thickness of the rear positive C-plate 720 in the display device according to the embodiment of the present invention. The positive C-plate 700 of the display device according to another embodiment of the present invention may include a material same as the front positive C-plate 710 and the thickness of the rear positive C-plate 720 of the display device according to the embodiment of the present invention. Thus, in the display device according to another embodiment of the present invention, the degree of freedom for the location of the positive C-plate 700 may be improved. Therefore, in the display device according to another embodiment of the present invention, the compensation of the refractive index according to the angle may be efficiently performed, and the process efficiency may be increased.

The display device according to the embodiment of the present invention is described that the display panel 100 includes the light-emitting element 140. However, the display device according to another embodiment of the present invention may include the display panel 100 of various types. For example, in the display device according to another embodiment of the present invention, the display panel 100 may be a liquid crystal panel. Thus, the display device according to another embodiment of the present invention may include a backlight unit 900 to supply light the display panel 100, a first linear polarizer 410 attached to a surface of the display panel 100 facing the eyepiece 200, and a second linear polarizer 420 attached to a surface of the display panel 100 facing the backlight unit 900, as shown in FIG. 6. The transmission axis of the second linear polarizer 420 may be perpendicular to the transmission axis of the first linear polarizer 410. The backlight unit 900 may uniformly irradiate the display panel 100. For example, the backlight unit 900 may be an edge type. The backlight unit 900 may include a light guide plate, at least one light source on a side of the light guide plate, and an optical sheet on the light guide plate. For example, the backlight unit 900 may be a direct type. The backlight unit 900 may include optical sheets having a diffusion plate, and light sources disposed in parallel with the diffusion plate. Thus, in the display device according to another embodiment of the present invention, the deterioration of the quality of the image which is provided to the user through the eyepiece 200 may be minimized, and the overall thickness may be reduced regardless of the type of the display panel 100.

Figure 7:
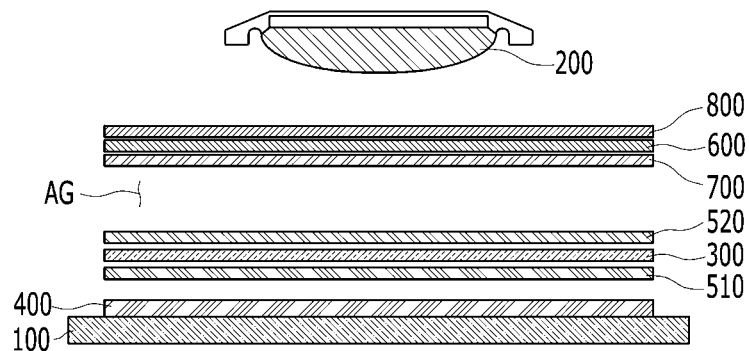

The display device according to the embodiment of the present invention is described that the air gap is disposed between the rear quarter-wave plate 520 and the linear reflective polarizing plate 600. However, the display device according to another embodiment of the present invention may form the air gap at various positions using the components between the half-mirror 300 and the linear reflective polarizing plate 600. For example, in the display device according to another embodiment of the present invention, the rear quarter-wave plate 520 may be attached to a surface of the half-mirror 300 and the positive C-plate 700 may be attached to the linear reflective polarizing plate 600, so that the air gap AG may be disposed between the rear quarter-wave plate 520 and the positive C-plate 700 as shown in FIG. 7. The display device according to another embodiment of the present invention may include single positive C-plate 700. Thus, in the display device according to another embodiment of the present invention, the degree of freedom for the positions of the positive C-plate 700 may be further improved. Therefore, in the display device according to another embodiment of the present invention, the compensation of the refractive index according to the angle may be efficiently performed by the positive C-plate 700.

In the result, the display device according to the embodiments of the present invention may increase the path of the light travelling toward the eyepiece from the display panel by using the polarizer and the quarter-wave plate, and may prevent light leakage in the diagonal direction due to the quarter-wave plate by using positive C-plate. Thus, in the display device according to the embodiments of the present invention, the viewing angle of the image recognized to the user may be increased. Therefore, in the display device according to the embodiments of the present invention, the overall thickness may be reduced without the deterioration of the quality of the image.

It will be apparent to those skilled in the art that various modifications and variations can be made in the display device having an eyepiece of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   an eyepiece on a display panel;
   an optical module including a front linear polarizer, a front quarter-wave plate, a half-mirror, a rear quarter-wave plate and a linear reflective polarizing plate which are sequentially stacked between the display panel and the eyepiece; and
   a first positive C-plate on a path of light travelling toward the eyepiece from the display panel in the optical module, wherein the optical module further includes an air gap disposed between the rear quarter-wave plate and the linear reflective polarizing plate.

2. The display device according to claim 1, wherein a refractive index of the first positive C-plate in a X direction is the same as a refractive index of the first positive C-plate in a Y direction perpendicular to the X direction,
wherein a refractive index of the first positive C-plate in a thickness direction is larger than the refractive index of the first positive C-plate in the X direction, and
wherein the retardation in a bottom surface of the first positive C-plate is zero.

3. The display device according to claim 1, wherein the first positive C-plate is disposed between the half-mirror and the rear quarter-wave plate.

4. The display device according to claim 1, further comprising:
an image member in which the display panel is mounted;
a mounting member for fixing the image member to user;
a coupling member coupling the mounting member and the image member; and
a gap holding member on an inner surface of the coupling member,
wherein the air gap is maintained by the gap holding member.

5. The display device according to claim 1, further comprising a second positive C-plate between the front quarter-wave plate and the half-mirror.

6. The display device according to claim 5, wherein the second positive C-plate includes a material same as the first positive C-plate.

7. The display device according to claim 5, wherein a retardation of the second positive C-plate in the thickness direction is the same as a retardation of the first positive C-plate in the thickness direction, and wherein a thickness of the second positive C-plate is the same a thickness of the first positive C-plate.

8. The display device according to claim 1, wherein the optical module further include a rear linear polarizer, and
wherein the linear reflective polarizing plate is disposed between the rear quarter-wave plate and the rear linear polarizer.

9. A display device, comprising:
a half-mirror between a display panel and an eyepiece;
a front quarter-wave plate between the display panel and the half-mirror;
a front linear polarizer between the display panel and the front quarter-wave plate;
a rear quarter-wave plate between the half-mirror and the eyepiece;
a linear reflective polarizing plate between the rear quarter-wave plate and the eyepiece; and
a positive C-plate on a path of light travelling toward the eyepiece from the display panel,
wherein the optical module further includes an air gap disposed between the rear quarter-wave plate and the linear reflective polarizing plate.

10. The display device according to claim 9, wherein the positive C-plate has a retardation of 30 to 330 in a thickness direction.

11. The display device according to claim 9, wherein the positive C-plate is disposed between the rear quarter-wave plate and the linear reflective polarizing plate.

12. The display device according to claim 11, wherein the air gap is disposed between the rear quarter-wave plate and the positive C-plate.

13. The display device according to claim 1, wherein the display panel includes a lower substrate, a lower electrode, a light-emitting layer, an upper electrode and an upper substrate, which are sequentially stacked.

* * * * *